United States Patent [19]

Loewen

[11] 3,723,922
[45] Mar. 27, 1973

[54] SPLIT HUB LOCKING DEVICE

[76] Inventor: Theodor Loewen, 102 Willowridge Road, Weston, Ontario, Canada

[22] Filed: July 6, 1972

[21] Appl. No.: 269,472

[52] U.S. Cl. ...................335/68, 200/163, 335/71
[51] Int. Cl. ...............................................H01h 3/28
[58] Field of Search.....200/166 H, 163; 335/71, 255, 335/257, 258, 262, 68

[56] References Cited

UNITED STATES PATENTS

| | | |
|---|---|---|
| 3,268,687 | 8/1966 | Waghorne............................335/71 |
| 2,462,283 | 2/1949 | Rathert................................200/163 |
| 3,346,710 | 10/1967 | Weston et al.........................200/163 |

*Primary Examiner*—Harold Broome
*Attorney*—J. A. Legris

[57] ABSTRACT

A vacuum circuit breaker includes separable contact structure including a contact movable from a closed circuit position to an open circuit position; a motor for moving the contact from the closed circuit position to the open circuit position with a velocity sufficient to prevent arc restriking after a current zero; a shaft connected to and movable with the movable contact; a pair of inner and outer support hubs having respective aligned openings for slidably receiving the shaft in the respective closed circuit and open circuit positions of the movable contact; the shaft having a taper at its outer end and the outer support hub having a taper of smaller taper angle whereby the shaft is wedged into the opening of the outer hub as it approaches the open circuit position so that kinetic energy of the shaft is frictionally dissipated and the shaft comes to rest in the open circuit position of the movable contact; the outer support hub being constructed as a split sleeve, each sleeve section providing an axially extending cantilever spring adapted to engage the shaft taper frictionally.

6 Claims, 3 Drawing Figures

PATENTED MAR 27 1973 3,723,922

SPLIT HUB LOCKING DEVICE

This invention relates to improvements in electrical circuit breakers and in particular to vacuum circuit breakers for interrupting a high voltage electrical power circuit.

A circuit breaker is a device for interrupting an electric power circuit between separable contacts during normal and abnormal conditions. Under normal conditions, circuit breakers are used to control the flow of energy in a power system; for example, they may be used to open a transmission line or to remove a generator or a transformer bank from the system. Under abnormal conditions, such as short-circuit or over-load conditions, circuit breakers are used to isolate the portion of the circuit in which the abnormal condition has occurred.

In recent years, the demand for electrical power has steadily increased, and circuit breakers are now often required to switch large amounts of electrical power at voltages in excess of 100 kilovolts. The design of circuit breakers for this range of voltages entails special engineering problems; for example, a major problem is the control of the arc which forms between the contacts of a circuit breaker when the contacts are separated in a dielectric. As the contacts begin to separate, they are at first relatively close together, and if the voltage across the separated contacts exceeds the dielectric strength of the dielectric material between the contacts, the dielectric material breaks down and forms a highly conductive ionized arc-path for current to flow. The arc thus formed may continue to exist even when the contacts have reached their maximum predetermined separation. When the current flowing through the breaker passes through a current zero, the arc will become extinguished and the circuit will be interrupted if the arc-path becomes sufficiently deionized and regains sufficient dielectric strength quickly enough in order to resist the subsequent growth of recovery voltage. Thus, as the voltage between the separated contacts begins to rise after a current zero, the dielectric strength of the arc-path must continue to rise at a faster rate and be greater than the rising voltage between the contacts, in order to maintain arc extinction. If the dielectric material does not achieve sufficient dielectric strength quickly enough, the arc may re-strike and thus cause undesirable conduction between the contacts of the circuit breaker. Up to the present, the design of high voltage circuit breakers has been largely concerned with establishing, controlling and extinguishing this arc.

Various dielectric media have been used to initially sustain the arc and then to extinguish it. Mineral oil is commonly used as a dielectric, and when the contacts of a circuit breaker separate under oil, the oil between the contacts breaks down and the resultant arc plays in a high pressure gas bubble, formed by the decomposing oil. Arrangements have been devised to use the gaseous pressure produced by the arc to force cool oil through the arc in order to extinguish it. In other types of circuit breakers, blasts of compressed air are introduced into the circuit breaker as the contacts separate. More recently, sulphur hexfluoride gas under pressure and also vacuum have been used as dielectric media.

At high voltages, such circuit breakers are expensive and rather unwieldy in size for they must be able not only to continuously carry the rated load current and to interrupt the circuit under abnormal conditions but they must also be able to withstand pressures produced by the internal arc. The expense and bulkiness of a high voltage circuit breaker could be reduced if the contacts could be caused to begin to separate, not at a random point on the current wave (as in present circuit breakers) but at the instant of a current zero, and the rate of separation made to proceed rapidly enough so that no arc-path and consequently no conduction occurs between the separated contacts. If this could be done, no initial arc and no re-strike would occur, thus eliminating a major engineering problem in the design of high voltage circuit breakers.

In order to achieve this goal, however, the separable contacts in the circuit breaker must be moved apart with great velocity and high acceleration. Vacuum is an excellent dielectric for this purpose, but even in a vacuum, velocities of the order of 100 to 200 ft/sec. and accelerations of the order of 10,000 to 40,000 g seem indicated; no present breaker mechanism appears to be able to withstand such forces. In known circuit breakers a speed of 20 ft/sec. is considered very fast, because of the relatively high inertia of the parts that must be moved.

A timed vacuum circuit breaker in which the breaker contacts are arranged to open in a vacuum a few microseconds prior to the instant of a current zero, and in which the contacts separate rapidly enough to reduce initial arcing and prevent arc restriking, is described in U.S. Pat. No. 3,268,687 in the names J. H. Waghorne and H. A. Smith and dated Aug. 23, 1966.

The circuit breaker described in the above-mentioned patent includes a separable contact structure including a contact movable from a closed circuit position to an open circuit position, a motor for moving the contact from the closed circuit position to the open circuit position with a velocity sufficient to prevent arc restriking after a current zero, a shaft connected to and movable with the movable contact, and a pair of inner and outer hubs having respective aligned openings for slidably receiving the shaft in the respective closed circuit and open circuit positions of the movable contact. The shaft has tapers at its inner and outer ends, and the support hubs have corresponding tapers whereby the shaft is wedged into the opening of a hub as it approaches an end position so that the kinetic energy of the shaft is frictionally dissipated and the shaft comes to rest in the end position. The motor consists of an annular conductive disc rigidly mounted on the shaft and a pair of electromagnetic coils arranged coaxially with the disc and positioned relatively to the disc so as to repel the disc rapidly when current is discharged through the coils from a capacitor.

The present invention is particularly concerned with an improved hub construction for such a circuit breaker.

In a circuit breaker of the above construction the armature, that is the movable assembly including the annular conducting disc, is decelerated and locked in position by the wedging action of a tapered shaft section in the matching tapered opening of the hub. The wedging force and taper travel depend upon the impact velocity, the taper angle, and the rigidity of the hub. Increasing the taper angle results in a smaller locking force and a higher rate of deceleration; therefore it is desirable to use the greatest possible taper angle which will permit wedging of the shaft in the hub. Under static loading the maximum angle at which wedging can occur depends upon the coefficient of friction between the cooperating conical surfaces. For a coefficient of friction of 0.25 the maximum permissible taper angle would be about 14°. However, under impact loading the taper angle would need to be considerably smaller. When the shaft taper strikes the hub taper a compressive wave is initiated which travels the length of the shaft, and when the wave reaches the other end of the shaft the shaft acts as a compressed spring. As there is no load at the other end of the shaft, a tension wave moves back along the shaft. Therefore, if the release force caused by the tension wave is greater than locking force of the tapers, the tapered surfaces will disengage and cause armature "bounce."

It is found in practice that the locking action of the matching tapers described in the above patent is quite effective if only a few operations are required. However, after a number of operations wear of the taper surfaces makes it impossible to maintain consistent armature velocities and armature positions for a given driving (ie. motor) force.

According to the present invention, in order to reduce the locking force and the wear on the taper surfaces, the support hub is constructed as a split sleeve, each sleeve section providing an axially extending cantilever spring adapted to engage the shaft taper frictionally. The hub is thus made less rigid. The cantilever springs are tapered less than the shaft so that they resiliently engage the shaft when the taper of the latter enters the hub. As the shaft taper enters the hub the effective cantilever length of the springs is reduced; this increases the cantilever spring constant and hence the frictional force between the shaft and the hub.

It has been found that, with this construction, the mechanism has operated successfully at constant velocity and taper travel for more than 800 operations.

In order that the invention may be readily understood, one embodiment thereof will now be described, by way of example, with reference to the accompanying drawings, in which.

The circuit breaker is basically of the type described in U.S. Pat. No. 3,268,687.

Figure 1:
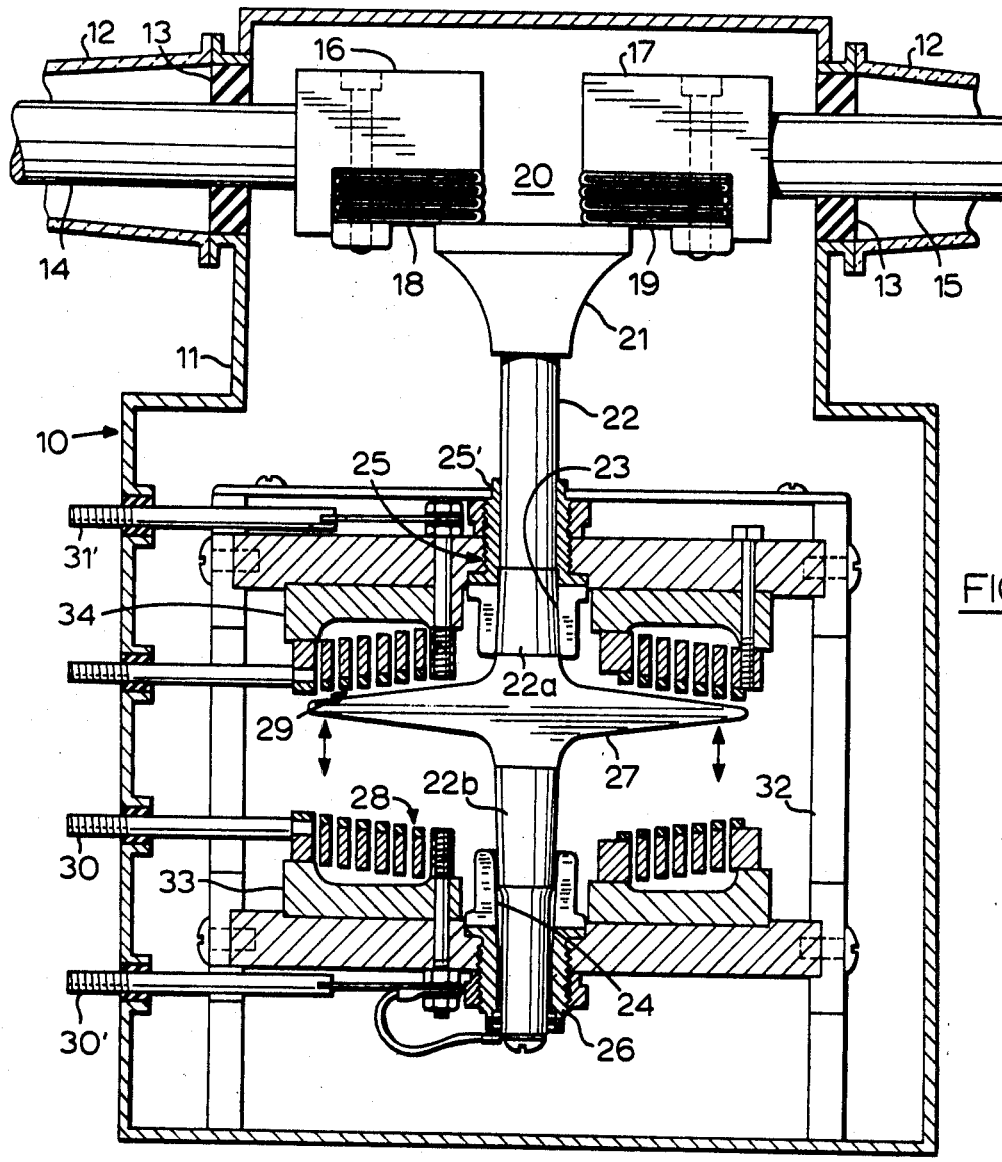
FIG. 1 shows in sectional elevation a vacuum circuit breaker embodying the invention.

Referring now to FIG. 1, the circuit breaker generally indicated at 10 has an evacuated T-shaped housing 11 consisting of a hollow metal cylinder closed at its ends, and having long tapered cones 12 of dielectric material extending from opposite sides of the cylinder. Two fixed line conductors 14 and 15 extend into the housing through the tapered cones 12 and are supported by solid dielectric material 13. The line conductors 14 and 15 have enlarged end portions 16 and 17 that are separated from each other by a gap 20, and the conductor end portions 16 and 17 have resilient conductive pads 18 and 19 constituting contact surfaces. The pads 18 and 19 can be of copper braid that is folded over upon itself.

A movable conductor 21 is secured to the inner end of a shaft 22 which is slidably received in aligned tapered openings 23 and 24 of an inner support hub 25 and an outer support hub 26, respectively. The shaft has two tapered portions 22a and 22b corresponding to the tapered openings 23 and 24 but of slightly larger taper angle; in the open circuit position of the circuit breaker the tapered portion 22b is wedged tightly into the tapered opening 24 and in the closed circuit position the tapered portion 22a is wedged tightly into the tapered opening 23.

The inner end and outer support hubs 25 and 26 are supported by a stationary mounting structure 32 which is fixedly secured to the housing 11 by any conventional means.

Extending normally from the shaft 22 at about its mid-point is a disc 27 of electrically conductive material such as high strength aluminum alloy, the disc being in the space between the inner and the outer support hubs 25 and 26. A motor is provided for opening and closing the circuit and it consists of a closing motor conductor or coil 28 and an opening motor coil 29 secured to the mounting structure 32. Leads 30, 30', 31, 31' from the coils 28 and 29 are brought out of the housing 11 through conventional insulated vacuum sealing bushings (not shown).

When the movable conductor 21 is in the closed circuit position it bridges the gap between the line conductors 14 and 15, and the disc 27 is adjacent to the opening motor coil 29. If a large current is discharged quickly into the opening motor coil a current of opposite phase is induced into the disc 27 and the disc 27 thereby is accelerated away from the opening motor coil. The conductor 21, being mechanically coupled to the disc 27, is therefore accelerated in the same direction as the disc 27 and it breaks contact with the conductive pads 18 and 19 thus interrupting the circuit. The conductor 21 continues to move away from the conductive pads 18 and 19 until the tapered portion 22b of the shaft engages the tapered opening 24 of hub 26; kinetic energy of the shaft is thereby expended in friction and the shaft comes to rest (without rebounding) in the open circuit position.

The accelerating force which propels the movable conductor 21 toward the open circuit position must be great enough to impart to the conductor 21 at least a critical velocity as defined below. The current for producing this force may be obtained by discharging a previously charged capacitor through the opening motor coil; a capacitor having approximately 30 mfd. capacity charged to a potential of 10,000 volts can supply the necessary force. As indicated above, it is desirable to interrupt the circuit only a few microseconds prior to a current zero, and it has been found that the accelerating discharge current must be initiated (and the motor thereby activated) between about 50–75 micro-seconds before the current zero to allow time for the current to rise to a level sufficient to cause the shaft and associated structure to begin to move. At the instant of circuit interruption, the current flowing through the line conductors is at or near a zero value, but voltage immediately begins to rise to the full line voltage or beyond. The movable conductor 21 must travel quickly enough to prevent restriking of the arc between it and the conductive pads 18 and 19 which it has just left; this is what is meant by the expression "critical velocity," referred to above. For example, if the recovery voltage wave is rising at a rate of 2,000 volts per micro-second, and if the dielectric strength of the vacuum within the housing is 1,000,000 volts per inch, the movable conductor 21 must move with a velocity of at least 2,000 inches per second or 167 feet per second.

In practice it may not be possible to ensure that the circuit is interrupted at the precise instant of a current zero. Nevertheless the circuit breaker will operate satisfactorily provided the circuit is interrupted shortly before a current zero. An arc of relatively low current may be formed if the circuit is interrupted a few microseconds before the current zero, but this arc will be extinguished quickly as the current passes through the current zero.

When the movable conductor 21 has thus been propelled to the open circuit position, the disc 27 is adjacent to the closing motor coil, and to return the movable conductor to the closed circuit position it is merely necessary to discharge current into the closing motor coil. The movable contact is thus forced to travel back to where it contacts the conductive pads 18 and 19.

The contact surfaces of the pads 18 and 19 and the contact surface of the movable conductor 21 can be of tungsten to provide a low resistance current path.

The circuit breaker is small enough to be conveniently placed inside a cable, and to do this the housing 11 can be secured to a solid insulated cable by means of the long tapered glass cones 12. The outer sheath of the cable (not shown) and the metal housing 11 provide a continuous metallic sheath for the circuit breaker. To connect the circuit breaker to an open line or to a bus the glass cones 12 can be provided with porcelain bushings. Peep holes (not shown) may be provided in housing 10 to allow visual inspection of the mechanism.

The housing should be evacuated to a pressure of about $10^{-4}$ mm. Hg or less.

Figure 3:
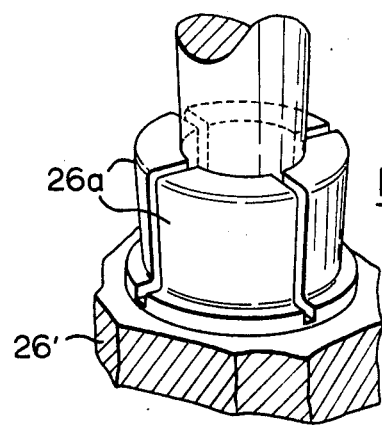
FIG. 3 illustrates a support hub of the breaker.

As best shown in FIG. 3, each of the support hubs 25,26 is constructed as a split sleeve mounted on a solid block 25', 26', the block being securely threaded and locked into a respective end plate of the stationary mounting structure 32 as shown in FIG. 1. The hubs are of beryllium-copper alloy. Each of the sleeve sections, for example 26a, provides a cantilever spring which extends axially upwards from the block and, being of smaller taper angle than the shaft taper, is adapted to engage the shaft taper frictionally. The hubs are therefore less rigid than the solid hubs of the above-mentioned patent, and the resilience of the cantilever springs permits a rapid locking or wedging action with a minimum of taper travel.

Figure 2:
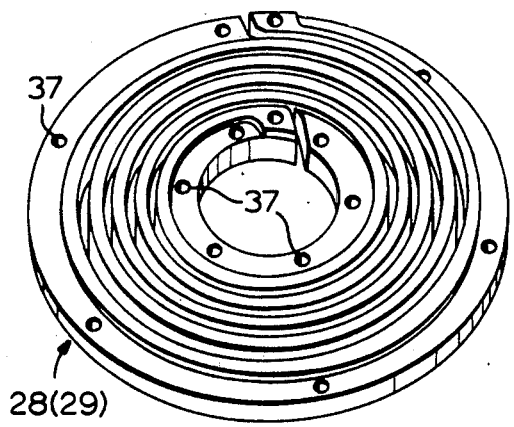
FIG. 2 illustrates an electromagnetic driving coil forming part of the motor of the breaker.

Each of the electromagnetic coils 28,29, one of which is shown unmounted in FIG. 2, is a self-supporting coil bolted to a rigid insulating support, such as 33 or 34, forming part of the stationary mounting structure 32. The coil is a rigid bimetallic plate of substantially uniform thickness and spiral configuration, and when bolted to the insulating support assumes a conical spiral shape which is complementary to the frusto-conical surface of the nearer face of the disc 27. The coil is formed by laminating a one-eighth inch plate of copper to a one-half inch plate of stainless steel, and cutting to the required spiral configuration by electric discharge machining. The copper component of the laminate, which provides the necessary current carrying capacity, defines the face of the coil nearer to the disc 27, that is, the concave side of the conical spiral. It will be noted that the inner and outer convolutions of the coil, 25 and 26, are substantially circular. These convolutions include bolt holes, such as 37, to permit these convolutions to be rigidly bolted to the supports 33,34. As shown in FIG. 1, the inner and outer convolutions, also provide terminal connections for the leads 30,30', 31,31'.

What I claim as my invention is:

1. In a vacuum circuit breaker:
   separable contact structure including a contact movable from a closed circuit position to an open circuit position;
   a motor for moving the contact from the closed circuit position to the open circuit position with a velocity sufficient to prevent arc restriking after a current zero;
   a shaft connected to and movable with the movable contact;
   a pair of inner and outer support hubs having respective aligned openings for slidably receiving the shaft in the respective closed circuit and open circuit positions of the movable contact;
   the shaft having a taper at its outer end and the outer support hub having a taper of smaller taper angle whereby the shaft is wedged into the opening of the outer hub as it approaches the open circuit position so that kinetic energy of the shaft is frictionally dissipated and the shaft comes to rest in the open circuit position of the movable contact;
   the outer support hub being constructed as a split sleeve, each sleeve section providing an axially extending cantilever spring adapted to engage the shaft taper frictionally.

2. A vacuum circuit breaker according to claim 1, wherein the shaft has a taper at its inner end and the inner support hub has a corresponding taper whereby the shaft is wedged into the opening of the inner hub as it approaches the closed circuit position so that kinetic energy of the shaft is frictionally dissipated and the shaft comes to rest in the closed circuit position of the movable contact, the inner support hub being constructed as a split sleeve, each sleeve section providing an axially extending cantilever spring adapted to engage the shaft taper frictionally.

3. A vacuum circuit breaker according to claim 2, wherein the support hubs are of beryllium-copper alloy.

4. In a vacuum circuit breaker:
   an evacuated housing;
   a pair of fixed line conductors having opposed end portions extending into the housing, the fixed line conductors being electrically insulated from one another and the end portions being separated by a gap;
   a bridging contact movable from a closed circuit position where it bridges the gap and electrically interconnects to line conductors, to an open circuit position;

a motor for moving the contact from the closed circuit position to the open circuit position with a velocity sufficient to prevent arc restriking after a current zero;
a shaft connected to and movable with the movable contact;
a pair of inner and outer support hubs having respective aligned openings for slidably receiving the shaft in the respective closed circuit and open circuit positions of the movable contact;
the shaft having a taper at its outer end and the outer support hub having a taper of smaller taper angle whereby the shaft is wedged into the opening of the outer hub as it approaches the open circuit position so that kinetic energy of the shaft is frictionally dissipated and the shaft comes to rest in the open circuit position of the movable contact;
the outer support hub being constructed as a split sleeve, each sleeve section providing an axially extending cantilever spring adapted to engage the shaft taper frictionally.

5. A vacuum circuit breaker according to claim 4, wherein the motor comprises a pair of axially spaced drive coils fixedly mounted within the housing, a conductive annular disc rigidly mounted on the shaft, and means for discharging electric current through the coils so that the disc is repelled from a first position adjacent to one drive coil, corresponding to the closed circuit position of the bridging contact, to a second position adjacent to the drive coil, corresponding to the open position of the bridging contact.

6. A circuit breaker according to claim 5, wherein resilient conductive pads are provided on the end portions of the fixed line conductors which are engaged by the bridging contact in its closed circuit position.

* * * * *